(12) United States Patent
Bamji

(10) Patent No.: US 6,323,942 B1
(45) Date of Patent: Nov. 27, 2001

(54) CMOS-COMPATIBLE THREE-DIMENSIONAL IMAGE SENSOR IC

(75) Inventor: Cyrus Bamji, Fremont, CA (US)

(73) Assignee: Canesta, Inc., Palo Alto, CA (US)

( * ) Notice: Subject to any disclaimer, the term of this patent is extended or adjusted under 35 U.S.C. 154(b) by 0 days.

(21) Appl. No.: 09/401,059

(22) Filed: Sep. 22, 1999

Related U.S. Application Data

(60) Provisional application No. 60/132,064, filed on Apr. 30, 1999.

(51) Int. Cl.[7] .................................................. G01C 3/08
(52) U.S. Cl. ........................ 356/5.01; 356/5.08; 356/5.04
(58) Field of Search ................................ 356/5.01–5.08, 356/141.1

(56) References Cited

U.S. PATENT DOCUMENTS

| | | | |
|---|---|---|---|
| 4,277,167 | * 7/1981 | Eppel . | |
| 4,708,473 | * 11/1987 | Metzdorff . | |
| 4,764,982 | * 8/1988 | Pfund . | |
| 5,446,529 | * 8/1995 | Stettner et al. | 356/4.01 |
| 5,682,229 | * 10/1997 | Wangler | 356/4.01 |
| 5,835,204 | * 11/1998 | Urbach | 356/5.01 |
| 5,892,575 | * 4/1999 | Marino | 356/5.01 |
| 5,953,110 | * 9/1999 | Burns | 356/5.01 |
| 6,137,566 | * 10/2000 | Leonard et al. | 356/141.1 |

* cited by examiner

Primary Examiner—Stephen C. Buczinski

(57) ABSTRACT

A three-dimensional imaging system includes a two-dimensional array of pixel light sensing detectors and dedicated electronics and associated processing circuitry fabricated on a common IC using CMOS fabrication techniques. In one embodiment, each detector has an associated high speed counter that accumulates clock pulses in number directly proportional to time of flight (TOF) for a system-emitted pulse to reflect from an object point and be detected by a pixel detector focused upon that point. The TOF data provides a direct digital measure of distance from the particular pixel to a point on the object reflecting the emitted light pulse. In a second embodiment, the counters and high speed clock circuits are eliminated, and instead each pixel detector is provided with a charge accumulator and an electronic shutter. The shutters are opened when a light pulse is emitted and closed thereafter such that each pixel detector accumulates charge as a function of return photon energy falling upon the associated pixel detector. The amount of accumulated charge provides a direct measure of round-trip TOF. In either embodiment, the collection of TOF data permits reconstruction of the three-dimensional topography of the light-reflecting surface of the object being imaged. The CMOS nature of the array permits random-order readout of TOF data if desired. Using a light source of a known wavelength and filtering out incoming light of other wavelengths permits use of the system with or without ambient light.

25 Claims, 7 Drawing Sheets

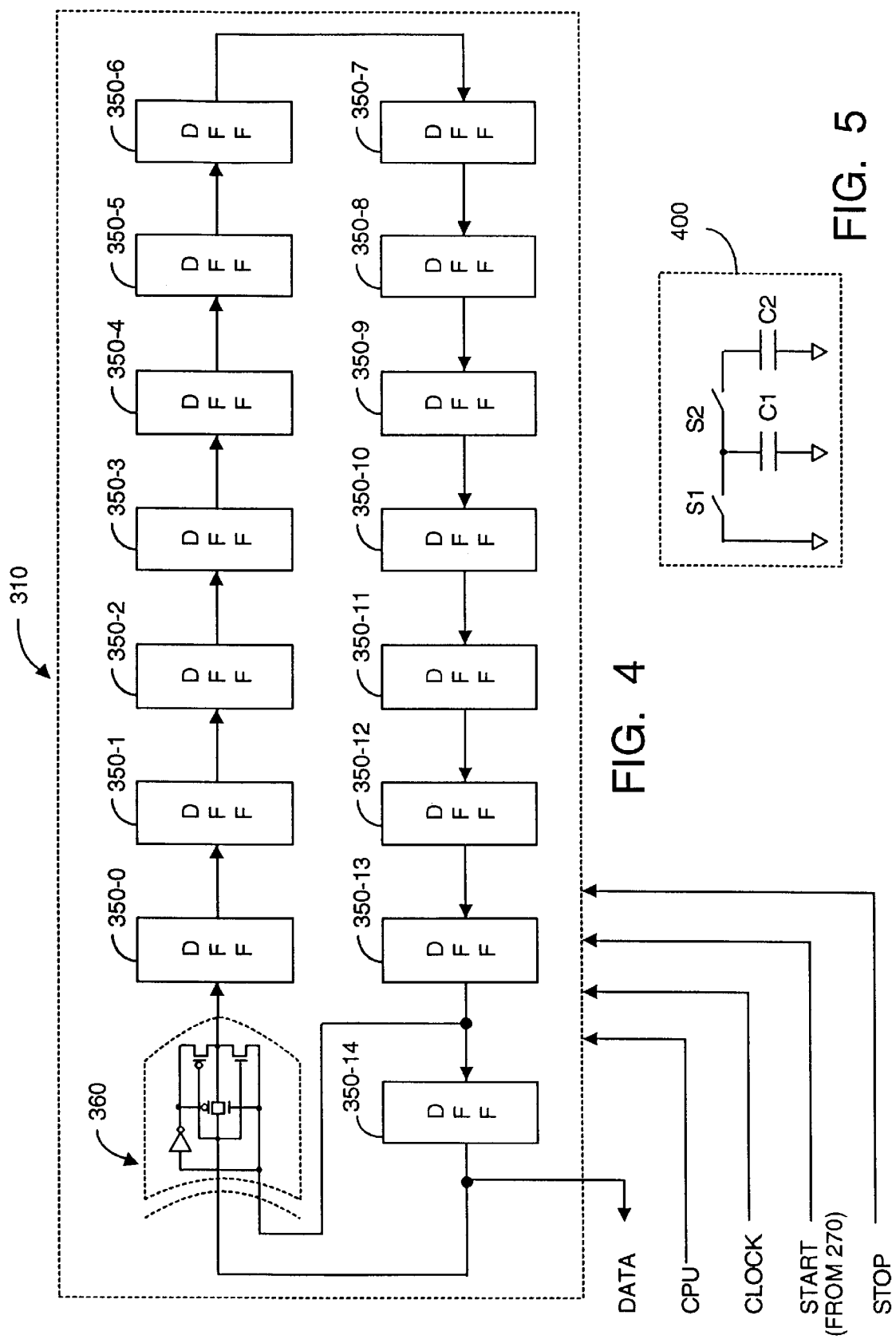

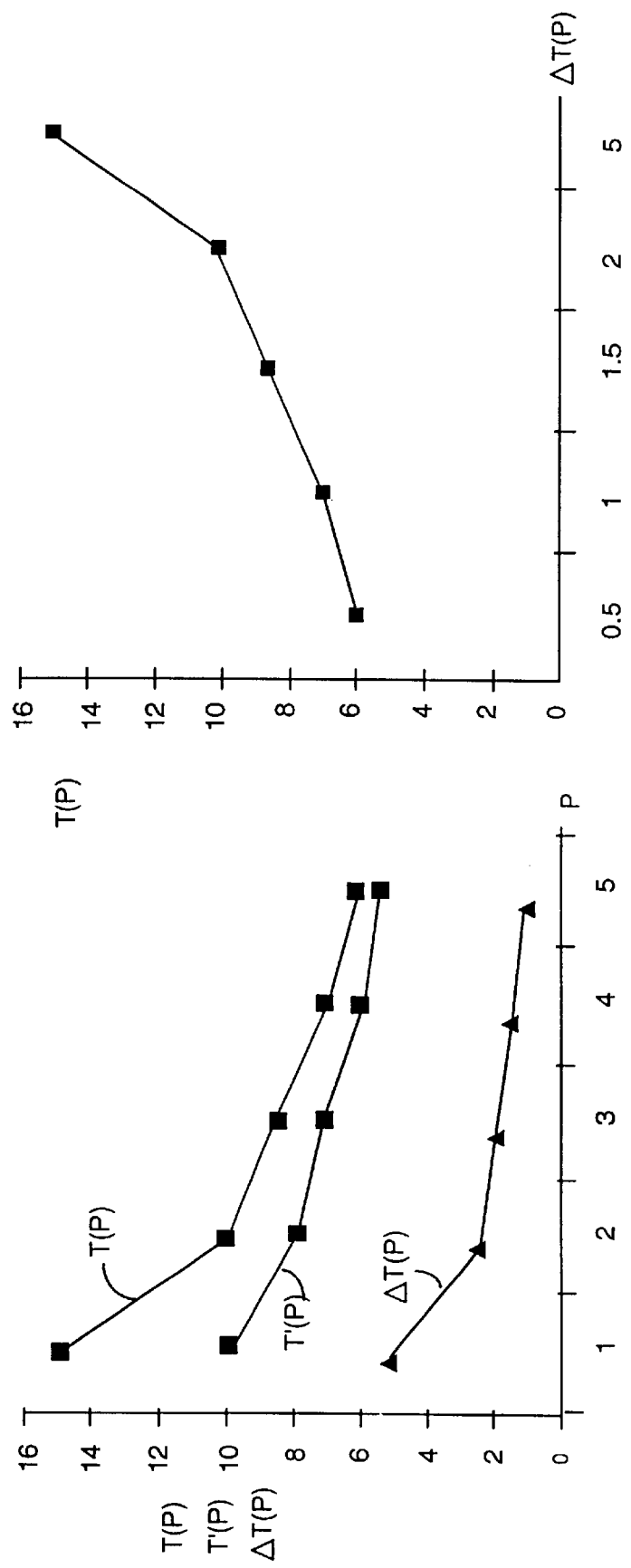

CMOS-COMPATIBLE THREE-DIMENSIONAL IMAGE SENSOR IC

RELATION TO PREVIOUSLY FILED APPLICATION

Priority is claimed from applicant's U.S. provisional patent application Ser. No. 60/132,064 filed on Apr. 30, 1999 entitled "Three Dimensional CMOS Sensor". Said application is incorporated herein by reference.

FIELD OF THE INVENTION

The invention relates generally to range finder type image sensors, and more particularly to such sensors as may be implemented on a single integrated circuit using CMOS fabrication.

BACKGROUND OF THE INVENTION

Electronic circuits that provide a measure of distance from the circuit to an object are known in the art, and may be exemplified by system 10 FIG. 1. In the generalized system of FIG. 1, imaging circuitry within system 10 is used to approximate the distance (e.g., WP, Z2, Z3) to an object 20, the top portion of which is shown more distant from system 10 than is the bottom portion. Typically system 10 will include a light source 30 whose light output is focused by a lens 40 and directed toward the object to be imaged, here object 20. Other prior art systems do not provide an active light source 30 and instead rely upon and indeed require ambient light reflected by the object of interest.

Various fractions of the light from source 30 may be reflected by surface portions of object 20, and is focused by a lens 50. This return light falls upon various detector devices 60, e.g., photodiodes or the like, in an array on an integrated circuit (IC) 70. Devices 60 produce a rendering of the luminosity of an object (e.g., 10) in the scene from which distance data is to be inferred. In some applications devices 60 might be charge coupled devices (CCDs) or even arrays of CMOS devices.

CCDs typically are configured in a so-called bucket-brigade whereby light-detected charge by a first CCD is serial-coupled to an adjacent CCD, whose output in turn is coupled to a third CCD, and so on. This bucket-brigade configuration precludes fabricating processing circuitry on the same IC containing the CCD array. Further, CCDs provide a serial readout as opposed to a random readout. For example, if a CCD range finder system were used in a digital zoom lens application, even though most of the relevant data would be provided by a few of the CCDs in the array, it would nonetheless be necessary to readout the entire array to gain access to the relevant data, a time consuming process. In still and some motion photography applications, CCD-based systems might still find utility.

As noted, the upper portion of object 20 is intentionally shown more distant that the lower portion, which is to say distance Z3>Z3>Z1. In an range finder autofocus camera environment, devices 60 approximate average distance from the camera (e.g., from Z=0) to object 10 by examining relative luminosity data obtained from the object. In FIG. 1, the upper portion of object 20 is darker than the lower portion, and presumably is more distant than the lower portion. In a more complicated scene, focal distance to an object or subject standing against a background would be approximated by distinguishing the subject from the background by a change in luminosity. In a range finding binocular application, the field of view is sufficiently small such that all objects in focus are at substantially the same distance. In the various applications, circuits 80, 90, 100 within system 10 would assist in this signal processing. As noted, if IC 70 includes CCDs 60, other processing circuitry such as 80, 90, 100 are formed off-chip.

Unfortunately, reflected luminosity data does not provide a truly accurate rendering of distance because the reflectivity of the object is unknown. Thus, a distant object surface with a shiny surface may reflect as much light (perhaps more) than a closer object surface with a dull finish.

Other focusing systems are known in the art. Infrared (IR) autofocus systems for use in cameras or binoculars produce a single distance value that is an average or a minimum distance to all targets within the field of view. Other camera autofocus systems often require mechanical focusing of the lens onto the subject to determine distance. At best these prior art focus systems can focus a lens onto a single object in a field of view, but cannot simultaneously measure distance for all objects in the field of view.

In general, a reproduction or approximation of original luminosity values in a scene permits the human visual system to understand what objects were present in the scene and to estimate their relative locations stereoscopically. For non-stereoscopic images such as those rendered on an ordinary television screen, the human brain assesses apparent size, distance and shape of objects using past experience. Specialized computer programs can approximate object distance under special conditions. Stereoscopic images allow a human observer to more accurately judge the distance of an object. However it is challenging for a computer program to judge object distance from a stereoscopic image. Errors are often present, and the required signal processing require specialized hardware and computation. Stereoscopic images are at best an indirect way to produce a three-dimensional image suitable for direct computer use.

Many applications require directly obtaining a three-dimensional rendering of a scene. But in practice it is difficult to accurately extract distance and velocity data along a viewing axis from luminosity measurements. Nonetheless many application require accurate distance and velocity tracking, for example an assembly line welding robot that must determine the precise distance and speed of the object to be welded. The necessary distance measurements may be erroneous due to varying lighting conditions and other shortcomings noted above. Such applications would benefit from a system that could directly capture three-dimensional imagery.

Although specialized three dimensional imaging systems exist in the nuclear magnetic resonance and scanning laser tomography fields, such systems require substantial equipment expenditures. Further, these systems are obtrusive, and are dedicated to specific tasks, e.g., imaging internal body organs.

In other applications, scanning laser range finding systems raster scan an image by using mirrors to deflect a laser beam in the x-axis and perhaps the y-axis plane. The angle of defection of each mirror is used to determine the coordinate of an image pixel being sampled. Such systems require precision detection of the angle of each mirror to determine which pixel is currently being sampled. Understandably having to provide precision moving mechanical parts add bulk, complexity, and cost to such range finding system. Further, because these systems sample each pixel sequentially, the number of complete image frames that can be sampled per unit time is limited.

In summation, there is a need for a system that can produce direct three-dimensional imaging. Preferably such system should be implementable on a single IC that includes both detectors and circuitry to process detection signals. Such single IC system should be implementable using CMOS fabrication techniques, should require few discrete components and have no moving components. Optionally, the system should be able to output data from the detectors in a non-sequential or random fashion.

The present invention provides such a system.

SUMMARY OF THE PRESENT INVENTION

The present invention provides a system that measures distance and velocity data in real time using time-of-flight (TOF) data rather than relying upon luminosity data. The system is CMOS-compatible and provides such three-dimensional imaging without requiring moving parts. The system may be fabricated on a single IC containing both a two-dimensional array of CMOS-compatible pixel detectors that sense photon light energy, and processing circuitry. A microprocessor on the IC continuously triggers a preferably LED or laser light source whose light output pulses are at least partially reflected by points on the surface of the object to be imaged.

An optical system including an off-chip filter and lens that focuses incoming light ensures that each pixel detector in the array receives light only from a single point on the surface of the imaged object, e.g., all optical paths are equal length from light source to reflecting object surface points to pixels in the array.

On-chip measured TOF data may be output in random rather than sequential order, and object tracking and other measurements requiring a three-dimensional image are readily made. The overall system is small, robust and requires relatively few off-chip discrete components.

In a first embodiment, for each pixel in the two-dimensional array the IC further includes an associated pulse detector, a high speed counter, and access to an on-chip high speed clock. When each light emitted pulse starts, each pixel detector's counter begins to count clock pulses and accumulates counts until incoming reflected light photons are detected by that pixel. Thus, the accumulated count value in each high speed counter is a direct digital measure of roundtrip TOF from the system to the reflecting object point corresponding to that pixel. On-chip circuitry can use such TOF data to readily simultaneously measure distance and velocity of all points on an object or all objects in a scene.

A second embodiment avoids the need for high speed detectors, counters, and clock. In this embodiment, the IC contains a similar two-dimensional array of pixel detectors, and further includes for each pixel a shutter mechanism and a charge integrator. The shutter mechanism turns on or off an output charge path from each pixel detector to the charge integrator, which may be a capacitor. Before a system-emitted light pulse, the micro-controller opens all shutters, which permits each integrator to collect any charge being output by the associated pixel detector. As object-reflected light energy begins to return to the detector array, pixels focused upon closer object surface points will start to detect and output charge, and after a while pixels focused on more distance points will begin to do likewise. Stated differently, integrators associated with such pixels will begin to integrate charge sooner in time. After a time approximating the emitted light pulse width, all shutters are closed (preferably simultaneously), thus terminating further charge accumulations. The accumulated charge magnitude for each pixel provides direct roundtrip TOF data to the object point upon which such pixel is focused. Preferably one set of data is collected with the shutter remaining on for perhaps the period of the emitted light pulse train frequency. Charge gathered during this data set represents point-by-point reflected lumiosity for the object surface, which permits correcting for errors caused by more distant but more reflective object surface portion.

Other features and advantages of the invention will appear from the following description in which the preferred embodiments have been set forth in detail, in conjunction with their accompanying drawings.

BRIEF DESCRIPTION OF THE DRAWINGS

FIG. 4 is a block diagram of a preferred implementation of a high speed counter PRSC counter, according to the present invention;

FIG. 5 depicts a preferred implementation for measuring subdivision capacitor charge, according to the present invention;

FIG. 6A depicts T(P), T' (P) and ΔT(P) vs P, according to the present invention;

FIG. 6B depicts T(P) vs. ΔT(P), according to the present invention;

DETAILED DESCRIPTION OF THE PREFERRED EMBODIMENT

Figure 1:
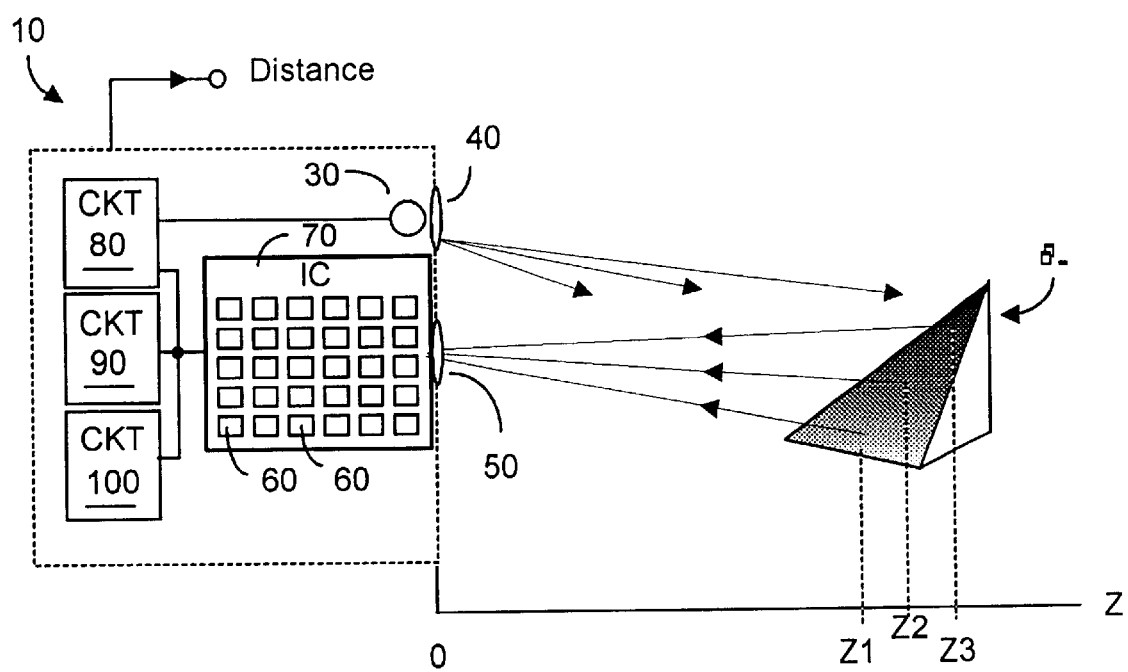
FIG. 1 is a diagram showing a generic luminosity-based range finding system, according to the prior art.
Figure 2:
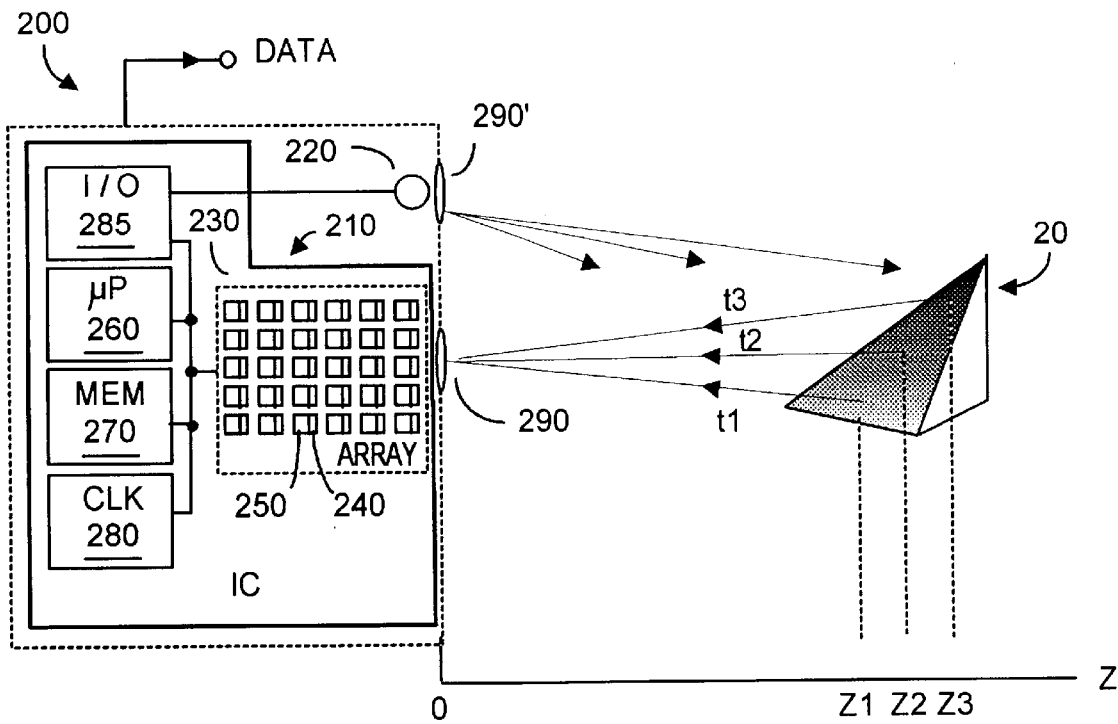
FIG. 2 is a diagram showing an a three-dimensional imaging system implemented on a single IC, according to a first embodiment of the present invention.

FIG. 2 is a block diagram depicting the present invention 200, a three-dimensional imaging system that preferably is fabricated on a single IC 210. The system requires no moving parts and relatively few off-chip components, primarily an light emitting diode (LED) or laser source 220 and associated optical focusing system. Indeed if suitable shielding were provided, one might bond laser source 220 onto the common substrate upon which IC 210 is fabricated.

System 200 includes an array 230 of pixel detectors 240, each of which has dedicated circuitry 250 for processing detection charge output by the associated detector. In a typical application, array 230 might include 100×100 pixels 230, and thus include 100×100 processing circuits 250. Preferably IC 210 also includes a microprocessor or micro-controller unit 260, memory 270 (which preferably includes random access memory or RAM and read-only memory or ROM), a high speed distributable clock 280, and various computing and input/output (I/O) circuitry 285. Among other functions, controller unit 260 may perform distance to object and object velocity calculations. Preferably the two-dimensional array 230 of pixel sensing detectors is fabricated using standard commercial silicon technology, which advantageously permits fabricating circuits 250, 260, 270, 280, and 285 on the same IC. Understandably, the ability to fabricate such circuits on the same IC with the array of pixel detectors can shorten processing and delay times, due to shorter signal paths.

Each pixel detector may be represented as a parallel combination of a current source, an ideal diode, and shunt impedance and noise current source. Each pixel detector will output a current proportional to the amount of incoming photon light energy falling upon it. Preferably CMOS fabrication is used to implement the array of CMOS pixel diodes or photogate detector devices. For example photodiodes may be fabricated using a diffusion-to-well, or a well-to-substrate junction. Well-to-substrate photodiodes are more sensitive to infrared (IR) light, exhibit less capacitance, and are thus preferred.

Figure 3:
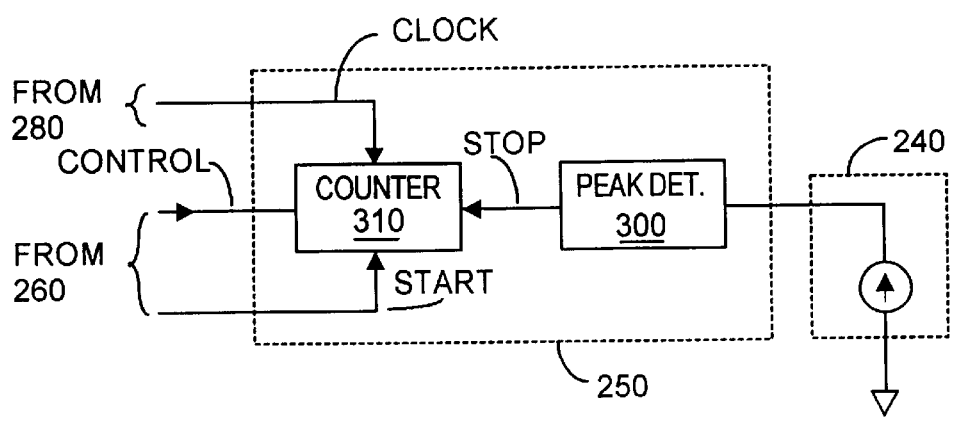
FIG. 3 is block diagram showing an individual pixel detector with associated photon pulse detector and high speed counter, according to the present invention.

As shown in FIG. 3, a circuit 250 is associated with each pixel detector 240, and includes a pulse peak detector 300, a high speed counter 310, and has access to the high speed clock 280. High speed clock 280, preferably formed on IC 210, outputs a continuous train of high frequency clock pulses (perhaps 250 ns pulse width) at a fixed frequency of perhaps 2 GHz with a duty cycle of perhaps 0.1% while the pulses are being output. Of course, other high speed clock parameters could instead be used. This pulse train is coupled to the input port of each high speed counter 310. Preferably each counter 310 also has a port to receive a START signal (e.g., start now to count), a port to receive a STOP signal (e.g., stop counting now), and a port to receive a CONTROL signal (e.g., reset accumulated count now). The CONTROL and START signals are available from controller 260, the CLOCK signal is available from clock unit 280, and the STOP signal is available from pulse peak detector 300.

In overview, system 200 operates as follows. At time t0, microprocessor 260 commands light source 220 to emit a pulse of light of known wavelength, which passes through focus lens 290' and travels to object 20 at the speed of light (C), 300 Km/sec. If light source 220 is sufficiently powerful, lens 290' may be dispensed with. At the surface of the object being imaged at least some of the light may be reflected back toward system 200 to be sensed by the detector array.

At or before time t0, each pixel counter 310 in array 230 receives a CONTROL signal from controller 260, which resets any count previously held in the counter. At time t0, controller 260 issues a START command to each counter, whereupon each counter begins to count and accumulate CLOCK pulses from clock 280. During the roundtrip time of flight (TOF) of a light pulse, each counter accumulates CLOCK pulses, with a larger number of accumulated clock pulses representing longer TOF, which is to say, greater distance between a light reflecting point on the imaged object and system 200.

The fundamental nature of focus lens 290 associated with system 200 is such that reflected light from a point on the surface of imaged object 20 will only fall upon the pixel in the array focused upon such point. Thus, at time t1, photon light energy reflected from the closest point on the surface of object 20 will pass through a lens/filter 290 and will fall upon the pixel detector 240 in array 230 focused upon that point. A filter associated with lens 290 ensures that only incoming light have the wavelength emitted by light source 220 falls upon the detector array unattenuated.

Assume that one particular pixel detector 240 within array 230 is focused upon a nearest surface point on object 20. The associated detector 300 will detect current that is output by the pixel detector in response to the incoming photon energy from such object point. Preferably pulse detector 300 is implemented as an amplifying peak detector that senses a small but rapid change in pixel output current or voltage. When the rapidly changing output current is sufficiently large to be detected, logic within detector 300 (e.g., an SR flipflop) toggles to latch the output pulse, which is provided as the STOP signal to the associated counter 310. Thus, the number of counts accumulated within the associated counter 310 will be indicative of roundtrip TOF to the near surface of object 20, a calculable distance Z1 away.

Distance Z1 may be determined from the following relationship in which C is the velocity of light:

$$Z1=C\cdot(t1)/2$$

At some later time t2 photon energy will arrive at lens 290 from a somewhat more distant portion of object 20, and will fall upon array 230 and be detected by another pixel detector. Hitherto the counter associated with this other detector has continued to count CLOCK pulses starting from time t0, as indeed have all counters except for the counter that stopped counting at time t1. At time t2, the pulse detector associated with the pixel just now receiving and detecting incoming photon energy will issue a STOP command to the associated counter. The accumulated count in this counter will reflect roundtrip TOF to the intermediate point on object 20, distance Z2 away. Within IC 210, controller 260 executing software stored in memory 270 can calculate distance and velocity associated with the TOF data for each light reflecting point on the object surface. Such data, or even raw TOF data, may be exported from the IC as DATA, perhaps to be further processed off-chip. Preferably DATA is exported in a format compatible to computer processing systems.

In similar fashion, at time t3 yet another pixel detector in the array will detect sufficient just-arriving photon energy for its associated pulse detector 300 to issue a STOP command to the associated counter. The accumulated count in this counter represents TOF data for the farthest distance Z3 of object 20.

Some pixels in the array may of course not receive sufficient reflected light from the object point upon which they are focused. Thus, after a predetermined amount of time (that may be programmed into controller 260), the counter associated with each pixel in the sensor array will have been stopped due to pulse detection, or will be assumed to hold a count corresponding to a target at distance Z=infinity.

In a motion picture application, e.g., where system 200 is perhaps used to calculate surface distances to objects to be matted, assume that the sensor array is to operate continuously at 30 frames per second, which is to say each frame shall last less than 0.33 seconds. In this application, objects at distances greater than about 50,000 Km (e.g., Z=C·0.33s/2) cannot be detected. In practical applications, however, system 200 will normally be used to image objects within a range of 100 m or less, and the above theoretical limit will not pose a problem. Thus, the predetermined time will be approximate 660 ns (e.g., 100 m·2/C), and any pixel not outputting a peak detection pulse after 660 ns may safely be assumed to be focused upon a target image point at Z=infinity.

With each detected reflected light pulse, the counter-calculated TOF distance value for each pixel in the array is determined and preferably stored in a frame buffer in RAM associated with unit 270. Preferably microprocessor 260 examines consecutive frames stored in RAM to identify objects in the field of view scene. Microprocessor 260 can then compute object velocity. In addition to calculating distance and velocity, the microprocessor and associated on-chip circuitry can be programmed to recognize desired image shapes. Any or all of this data (denoted DATA in FIG. 2) can be exported from the IC to an external computer for further processing, for example via a universal serial bus.

The above example described how three pixel detectors receiving photon energies at three separate times t1, t2, t3 turn-off associated counters whose accumulated counts could be used to calculate distances Z1, Z2, Z3 to object 20. In practice, the present invention will process not three but thousands or tens of thousands of such calculations per each light pulse, depending upon the size of the array. Such processing can occur on IC chip 210, for example using microprocessor 260 to execute routines stored (or storable) in memory 280. Each of the pixel detectors in the array will have unique (x,y) axis locations on the detection array, and the count output from the high speed counter associated with each pixel detector can be uniquely identified. Thus, TOF data gathered by two-dimensional detection array 230 may be signal processed to provide distances to a three-dimensional object surface.

It will be appreciated that output from CMOS-compatible detectors 240 may be accessed in a random manner if desired, which permits outputting TOF DATA in any order.

Light source 220 is preferably an LED or a laser that emits energy with a wavelength of perhaps 800 nm, although other wavelengths could instead be used. Below 800 nm wavelength, emitted light starts to become visible and laser fabrication becomes more difficult. Above 900 nm laser efficiency drops off rapidly, and in any event, 1100 nm is the upper wavelength for a device fabricated on a silicon substrate, such as IC 210. As noted, by emitted light pulses having a specific wavelength, and by filtering out incoming light of different wavelength, system 200 is operable with or without ambient light. The ability of system 200 to function in the dark can be advantageous in certain security and military type imaging applications.

As noted, lens 290 preferably focuses filtered incoming light energy onto sensor array 230 such that each pixel in the array receives light from only one particular point (e.g., an object surface point) in the field of view. The properties of light wave propagation allow an ordinary lens 290 to be used to focus the light onto the sensor array. If a lens is required to focus the emitted light, a single lens could be used for 290, 290' if a mirror-type arrangement were used.

In practical applications, sensor array 230 preferably has sufficient resolution to differentiate target distances on the order of 1 cm. Stated differently, this implies each pixel must be able to resolve time differences on the order of 70 ps (e.g., 2·1 cm/C). In terms of a CMOS-implemented system specification, high speed counters 310 must be able to resolve time to within about 100 ps, and peak pulse detectors 300 must be low-noise high speed units also able to resolve about 100 ps with a detection sensitivity on the order of perhaps a few microvolts ($\mu V$) Accurate distance measurements will require that the pulse detector response time be removed from the total elapsed time. Finally, the CLOCK signal output by circuit 280 should have a period on the order of about 100 ps.

As noted above, each counter 310 preferably can resolve distances on the order of 1 cm, which implies resolving time to the order of about 70 ps. Using a 12-bit counter with a 70 ps cycle time would yield a maximum system detection distance of about 40 m (e.g., $2^{12} \cdot 1$ cm). Implementing an ordinary 12-bit counter would typically require perhaps 48 gates, each of which would require typically 30 ps, for a total propagation time of perhaps about 1.5 ns. This in turn would limit the fastest system clock cycle time to at least about 1.5 ns. Using carry look-ahead hardware might, at a cost, reduce counter propagation time, but would still render a system 70 ps cycle time quite difficult to achieve.

In the first preferred embodiment, a so-called pseudo random sequence counter (PRSC), sometimes termed a linear shift register (LSR), is used. A counter 310 so implemented does not require rippling or propagating a signal through the entire counter. Instead, the signal ripples only through about two levels of logic, which implies that 60 ps or so propagation is realizable using existing CMOS technology. On the other hand, unlike conventional sequential counters, a PRSC counter counts though a seemingly random sequence of numbers. Hence a 12-bit PRSC will count though all the numbers between 0 and 4096 but in seemingly random order, e.g., 107, 3733, 28, etc. However in the present invention such randomness is dealt with by translating the PRSC-generated number into a sequential count number using decoding logic. Such translation operation is not time critical, and may be performed with auxiliary logic circuitry including controller 260 on IC 210 after detection of reflected light pulses.

FIG. 4 depicts a preferred embodiment of a high speed counter 310 implemented as a 15-bit PRSC unit. In this embodiment, PRSC 310 comprises 15 series-coupled shift registers denoted 350-0, 350-1, . . . 350-14, one for each bit. Input to the first bit (350-0) is a logic function of other bits in the overall shift register. For a given counter bit length, the correct feedback function that maximizes counter count length is given in an application note published by Xilnx (XAPP 052, Jul. 7, 1996 (ver. 1.1) entitled "Linear Feedback Shift Register Taps", and included herein by reference. The bits required for the feedback function as well as the feedback complexity depend upon counter bit length.

For maximum counter speed and efficiency and speed it is advantageous to select a counter bit length whose feedback function is readily implemented using a small number of bits. The above-referenced Xilinx application note indicates that the simplest function is a two input XNOR function, denoted 360 in FIG. 4, which is recommended for a 10-bit, a 15-bit, and a 17-bit feedback register. The counter length should simplify the feedback bit physical layout by using a feedback bit close to the last bit or the first bit. Typically the output of some register bits and the last register bit are fedback to the beginning of the register. However a counter with a linear layout will require passing the feedback signal through a comparatively long wire from the last bit to the first bit, an undesirable configuration for performance critical counters used in system 200.

A long feedback path (and associated time delay) may be avoided by folding the counter at least in half such that the last bits and other feedback tapped bits are close to the first bit in the overall register. For this reason, the 15-bit counter shown in FIG. 4 was selected, in which bits 14 and 15 are fedback into bit 1 via XNOR gate 360, and the various registers are implemented with flipflops clocked by the common CLOCK signal. This configuration advantageously results in the last bits being physically close to the first bit. A DATA signal is output from the last register of each counter, as shown. Inputs to each counter 310 include CLOCK, START, STOP, and a CPU-issued CONTROL signal, as shown in FIG. 4.

As noted, the counter/shift registers must function at cycle times on the order of a few gate delays, which implies the latches or flip-flops comprising the high speed counter must also operate such cycle times. This constraint excludes the use of multiphase clocking due to probable clock skew between phases that could exceed a few gate delays. Further, latches requiring both CLOCK and its complement are avoided due to probable excess skew between the two signals. Thus, the preferred embodiment uses a common single phase CLOCK signal, and latches or flip-flops implementing each high speed counter 310 do not require complementary CLOCK signals. True single-phase clocking schemes (TSPC) including the so-called NORA TSPC scheme are known to those skilled in the relevant art.

Maximum overall clock speed is governed by the delay of the feedback function at the first bit of the high speed counter (see FIG. 4), whose delay must therefore be minimized. For this reason, the pass gate configuration shown within block 360 is preferred to implement the two-input XNOR gate function.

A high clock rate and resultant 70 ps high speed counter performance is achievable using a 0.18 $\mu$ process. However this performance may be difficult to attain using the 0.35 $\mu$ or larger process required to obtain the greater sensitivity that IR wavelength light detection, e.g., 800 nm, can provide.

To help compensate for the possible use of larger fabrication gate widths, a two-tier approach may be used to implement counters 310. In such approaches, the CLOCK rate that is counted is actually slower than the minimum resolvable time of the overall system. Each clock tick of the counter is further subdivided into smaller subdivisions. Within a clock tick a so-called subdivision capacitor is charged, and the amount of charge on the capacitor is used to identify arrival time of a detected light energy pulse within a CLOCK period.

For example, subdivider capacitor charging may be started as soon as the incoming light pulse (or echo pulse) is detected, and charging of this capacitor is halted with the rising edge of the following clock period. As a result, the amount of charge on the subdivider capacitor will correspond to the differential between start of the detected return pulse and the start of the next clock period. An analog/digital (A/D) converter can measure the accumulated subdivider capacitor charge and determine therefrom charging time and thus arrival time of the detected pulse within the clock period.

The number of subdivisions for each clock tick can be small, for example on the order of ten subdivisions. A/D conversion time is not a critical factor, and conversion non-linearity can be corrected by software. A simple A/D converter 400 may thus be implemented as shown in FIG. 5, in which C2 is a subdivision capacitor, and solid state switches $S_1$ and S2 are alternately turned on and off. The rate of discharge of $C_2$ is proportional to $C_1/C_2$ ratio. Thus the charge on $C_2$ may be determined from the number of switch cycles required to reduce the voltage on $C_2$ below a certain level.

Referring to FIG. 4, the count values in PRSC counter 310 may first be stored in RAM (e.g., in memory 280), which permits also using the same PRSC counter to count the number of switch cycles required to discharge the associated subdivision capacitor $C_2$.

Referring to FIGS. 2 and 3, the photodetection and associated amplification circuitry 240, 250 must be able to detect extremely low levels of incoming photon energy, which means signal-to-noise (S/N) ratio on the detector outputs must be maximized. Preferably a differential approach is used to reduce effects of capacitive coupling and power supply noise. In this approach, a dummy pixel sensor (e.g., photodiode) having noise characteristics similar to an actual detector 240 is used. However the dummy sensor is covered with metal to prevent it from detecting incoming light. Thus, dummy detector output will be a pure noise signal having no light signal component. A differential comparator compares the pure noise output from the dummy detector with the signal plus noise output from an actual detector 240. The differential comparator output thus cancels the common mode noise present in both inputs, thereby enhancing the output S/N ratio.

Detector response time is compensated for as described below, with the result that detector repeatability is largely dependent upon noise. Multiple samples of the detector output may be taken and averaged to further reduce the standard deviation for detection time error. If $\sigma$ is the standard deviation of the error for one detection sample, then the standard deviation for the average of n samples will be:

$$\sigma_n = \sigma/\sqrt{n}.$$

In practice, detectors 240 and associated amplifier circuitry 250 may have response times substantially greater than 100 ps. Indeed the slew rate of light source 220 may be 10 ns or so, and is regarded as a response time. Each of these response times will vary with the characteristics of the technology with which system 200 is fabricated, but is otherwise independent of the distance to object 20. Additional delay resulting from detector and light source response times must be subtracted from the TOF measurements.

Let $S_r(t)$ be the response curve of the light source, e.g., a graphical plot of light source output when caused to pulse at time t0, and let P be the percent of light source light reflected from object 20. Let $D_r(f(t))$ be detection time of the detector amplifier as a function of f(t), where f(t) is a graphical plot of light shining on the sensor array as a function of time. Thus, $$f(t) = P \cdot S_r(t).$$

Once detector array 210 has achieved steady state operating temperature, amplifier and light source signal detection time will dependent only on P. If Z is the distance to the object, and C is the speed of light, total detection time as a function of P is given by:

$$T(P) = D_r(P \cdot S_r(t)) + Z/C$$

If a different response time for light source $S'_r(t)$ is used, total detection time is given by:

$$T'(P) = D_r(P \cdot S'_r(t)) + Z/C$$

The difference between the above two measurements yields:

$$\Delta T(P) = T(P) - T'(P) = D_r(P \cdot S_r(t)) - D_r(P \cdot S'_r(t))$$

Using calibration measurements made over a fixed known distance, one can construct a table of $\Delta T(P)$ vs. P, and $D_r(PS_r(t))$ vs. P. If $\Delta T(P)$ is monotonic in P, then it is possible from $\Delta T(P)$ to determine P using a reverse lookup table. This is generally be the case as $\Delta T(P)$ will usually decrease as P increases. From P one can obtain $D_r(P \cdot S_r(t))$ using another lookup table. Hence if $\Delta T(P)$ is monotonic in P, $D_r(P \cdot S_r(t))$ can be obtained from $\Delta T(P)$. To further streamline the lookup process, $D_r(P \cdot S_r(t)) = G(\Delta T(P))$ vs. $\Delta T(P)$ may also be directly obtained from calibration measurements and stored in table format, thus eliminating the intermediate P variable in the process.

From the above it follows that:

$$Z = C \cdot (T(P) - G(\Delta T(P)))$$

where T(P) and ΔT(P) are measured response times for a specific pixel. Note that T(P) and ΔT(P), which involves two measurements, are directly measured quantities, and hence it is not necessary to determine P.

In practice one might wish to choose $S'_r(t) = \frac{1}{2} S_r(t)$. For example, the first measurement pulse for T(P) may be illuminated with, say, two equal light sources, and T'(P) measured with one of the light sources being triggered. Other choices may instead be selected for S'(t). Any or all of the above-referenced lookup and reverse lookup tables may be stored in memory on IC 210, for example in memory 280.

FIG. 6A is an exemplary plot of T(P), T'(P) and ΔT(P) vs P. Delays T(P) and T'(P) are seen to increase with decreasing values of P, but their difference ΔT(P) also increases as P decreases. FIG. 6B is an exemplary plot showing T(P) vs. ΔT(P).

A potential problem with emitting a first high power pulse and a second lower power pulse to offset detection time is that the pixel detector response may be less than optimum when sensing the lower power pulse. Further, the need to take second pulse data can reduce the number of samples taken per frame. These problem may be overcome by measuring total amount of laser light falling upon each pixel. In essence, removing integration time from the detection time require knowledge of the integration time. Integration time is determined by examining total charge deposited on a pixel sensor responsive to an emitter pulse of laser light.

Thus, if the total deposited charge is say 3 mV for a 100 ns pulse width, and if the detector trip-point is say 0.5 mV, then the detection time is 16 ns (100 ns·(0.5/3)). Assume that a 1 ns tolerance on the charge at the pixel detector is to be detected with an accuracy of about 6%, which implies voltage measurement resolution of about 180 µV. This in turn suggests that the amount of charge should be boosted substantially before attempting to make accurate measurements. This is achieved by allowing charge to accumulate on the pixel detector over several pulses of the emitted light source, for example, taking 100 measurements per frame. After say three frames, the accumulated voltage will be on the order of 900 mV. An 8-bit analog-to-digital converter can measure such voltage to a resolution of about 1%, from which measurement knowledge of the voltage trip-point for each pixel amplifier and thus the integration time is ascertainable.

As noted, counters 310 require a very high-speed CLOCK signal having cycle time on the order of 100 ps, which CLOCK signal must be available at each pixel detector in array 210. Assuming system 200 is fabricated on an IC chip having dimensions 1 cm×1 cm, at least 70 ps (e.g., 1 cm/C) will be required solely for the clock signal traverse one side of the chip to the other. Distribution of a clock with 100 ps cycle time may be and remain beyond the capabilities of standard clock distribution techniques, where the clock pulse will propagate to each pixel during a clock cycle.

Any method that provides a high-speed CLOCK to each pixel detector in the array will suffice, as clock skew between pixels is unimportant in that there is no signal communication between pixel detectors. However, each pixel detector in the array must have access to the high-speed clock, which appears to exclude use of relatively expensive phase lock loop type local high-speed clock regeneration schemes, since ten thousand or so such regenerators would be required.

In the preferred embodiment, an efficient high-speed clock distribution system is implemented that uses a post-processing step based on pixel location in the array. This post-processing is carried out once detected light has been sampled, and can compensate for differences between arrival times of the CLOCK signal at the various pixels in the array. As noted, clock cycle time is on the order of a few inverter delays, yet the clock tree may have more levels of logic from the clock root to each pixel. However since clock skew between the pixels is relatively unimportant, different delays from the clock root to the pixels are acceptable. Indeed, even the logic height (in terms of number of inverters) for the clock tree may differ for different pixels.

In a standard clock distribution system, one clock signal has sufficient time to completely propagate from the root to the pixels before the next clock phase begins. However in the present invention such is not the case, since cycle time is on the order of an inverter delay, and there may be a large number of inverters from the clock root to a pixel.

In the present invention, cycle time constraint preferably is met by generating a falling clock edge at clock root before the preceding rising clock edge has arrived at all the pixels. Thus the root of the clock tree may be operating on one clock phase, while leaves of the clock tree may still be operating on the previous clock phases or cycles.

Each clock cycle may be regarded as a pulse travelling from the clock root to the leaves, where at any given time the clock tree may have several such waves travelling simultaneously from root to leaves. However, depending upon parasitic capacitance and device sizes, rising edges and falling edges of a wave may travel at slightly different speeds through the clock tree. As a result, after a few levels of logic the back of the wave may catch up with the front of the wave. When this occurs, the wave will disappear and the clock pulse will not propagate to the sensor pixels downstream. This phenomena is particularly pronounced when the wave pulses are very narrow, which is the case when the clock cycle times are extremely short.

Figure 7:
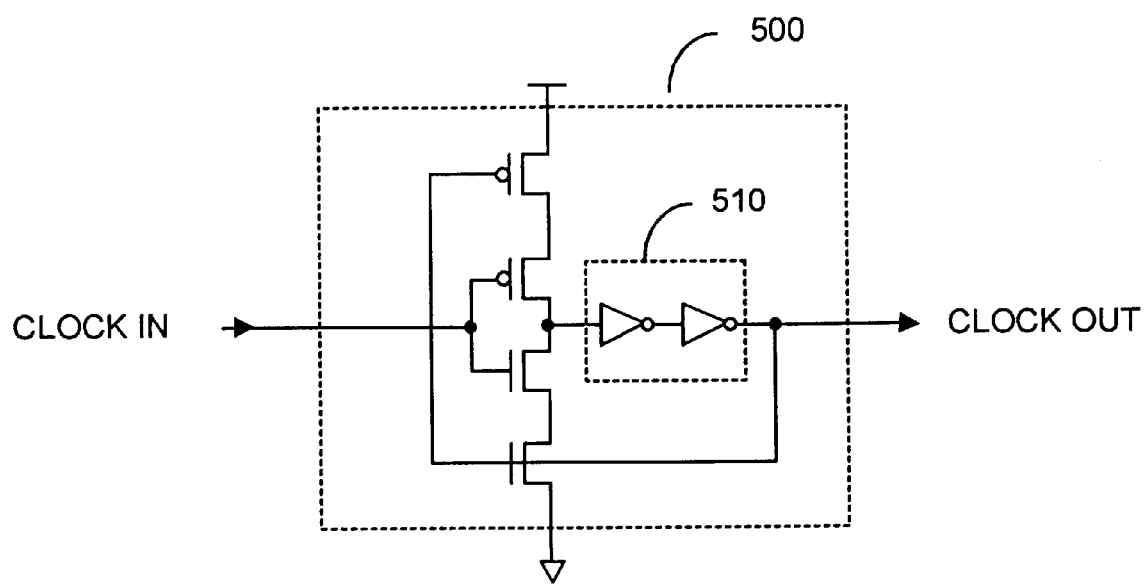
FIG. 7 depicts a preferred embodiment of a clock pulse width restorer, according to the present invention.

FIG. 7 depicts a preferred embodiment of a clock pulse width restorer 500 that prevents such wave disappearance. Circuit 500 prevents a rising (respectively falling) clock edge from propagating to the circuit output until a falling (respectively rising) clock edge is detected at the circuit input. This ensures that rising (respectively falling) edges and falling (respectively rising) edges are separated by at least a delay d corresponding to the delay created by circuit 500. Clock pulse width may be controlled by adding or deleting a buffer segment. Although FIG. 7 depicts a single buffer segment 510 comprising two serial-coupled inverters, more or fewer buffer segments may be used to adjust the pulse width.

Referring now to FIG. 2, on-chip processor 260 and/or associated memory 270 may be used to decode PRSC number sequences to actual elapsed time values. Processor 260 may also perform detector delay removal and pixel location based clock skew correction, and can also average multiple samples to reduce the detection time standard error.

As noted above, it can be challenging to provide acceptably fast CLOCK signals and high speed counters in the first embodiment of the present invention. Accordingly, a second embodiment is provided in which the clock circuit and high speed counters are eliminated.

Figure 8:
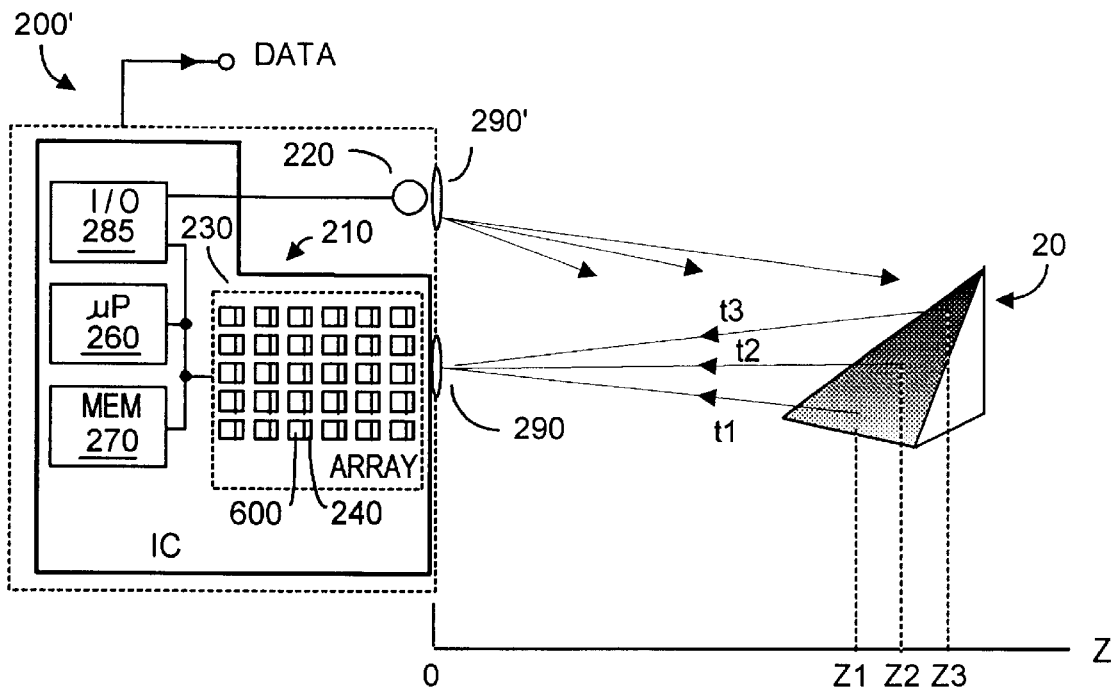
FIG. 8 is a diagram showing an a three-dimensional imaging system implemented on a single IC, according to a second embodiment of the present invention.

The second preferred embodiment is shown in FIG. 8, wherein system 200' includes a two-dimensional array 230 of pixel detectors 240, each pixel detector having an associated shutter and charge accumulator or integrator circuit 600. Components in FIG. 8 having like reference numerals to what was shown in FIG. 2 may be identical components to what has been described. Thus 210 is a single IC containing array 230, microprocessor or controller 260, memory unit 270, and input/output interface circuitry 285. As described with respect to system 200 shown in FIG. 2, a light source 220 emits light pulses through an optional lens 290', and reflecting light returning from an object 20 passes through a lens and filter 290, to fall upon pixels 240 in array 230.

Figure 9:
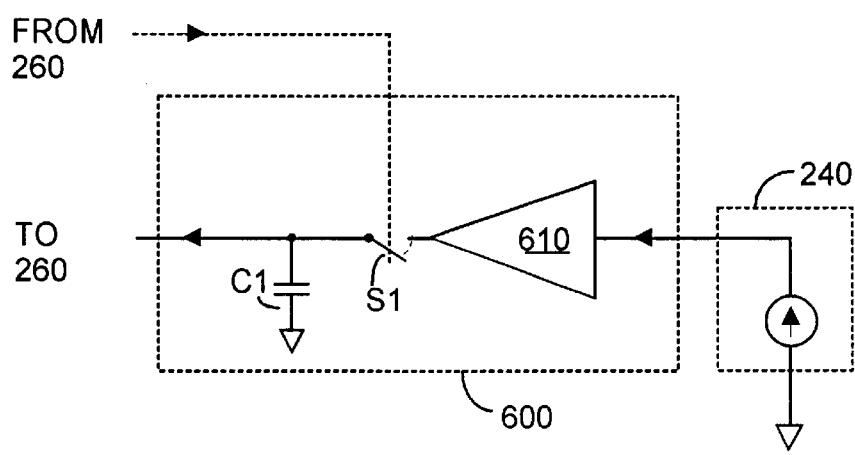
FIG. 9 is block diagram showing an individual pixel detector with associated shutter switch and pulse integrator, according to the present invention.

FIG. 9 depicts a preferred embodiment of circuitry 600 associated with each pixel detector 240. Within circuitry 600, the output of each pixel detector is coupled to an amplifier 610 whose output is coupled via an open (current passing) or closed (current-blocking) shutter S1 to a charge accumulator or integrator, shown here symbolically as a capacitor C1. Shutter S1 preferably is a high speed electronic switch, but may be an opto-mechanical shutter such as a ferro-electric material whose opaqueness may be rapidly altered in response to electronic control signals.

Figure 10:
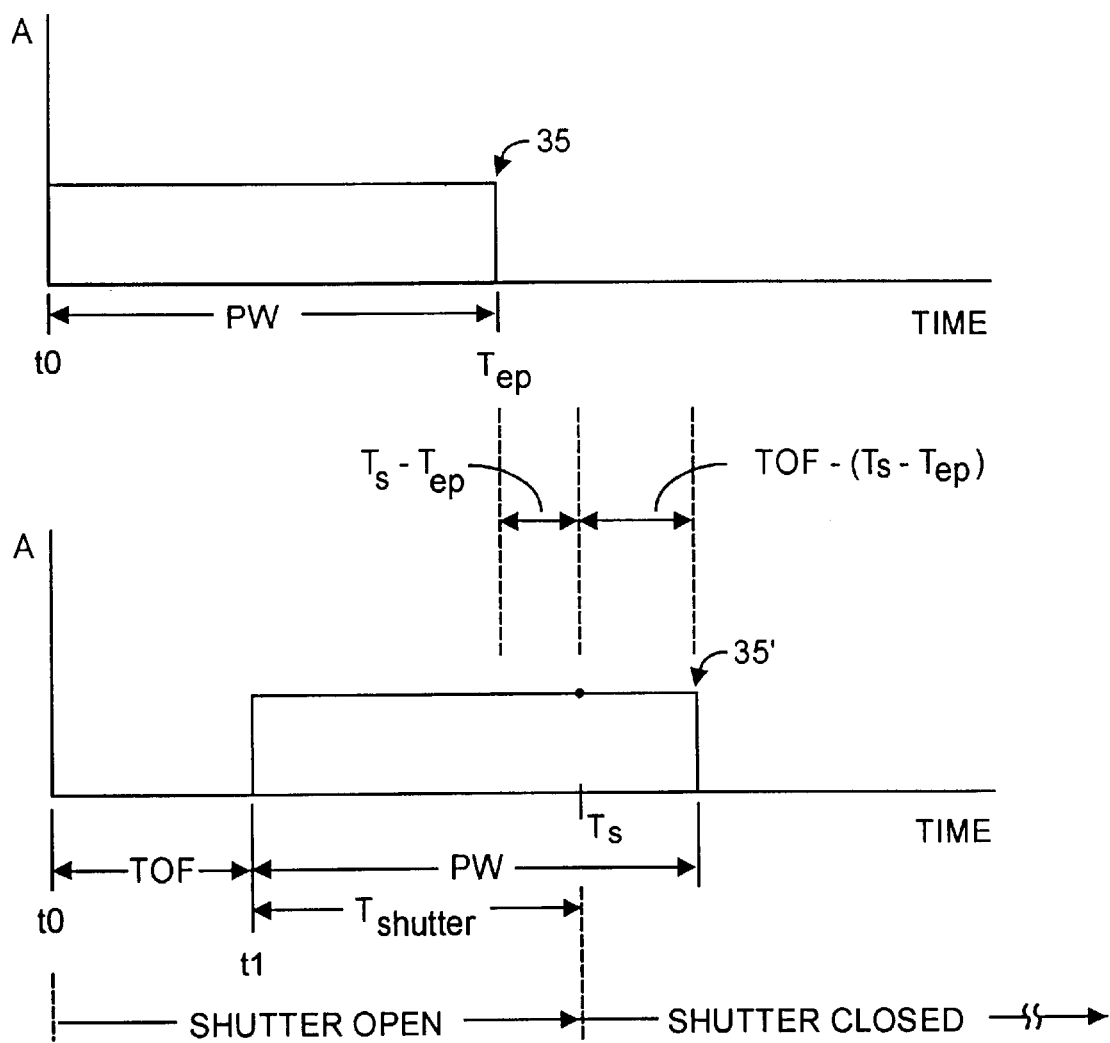
FIG. 10 depict timing relationships for the shutter-integrator embodiment of FIGS. 8 and 9.

FIG. 10 depicts timing relationship for the embodiment of FIG. 8 and 9. Specifically, at an initial time t0, energy emitter 220 (see FIG. 8) emits a pulse of energy 35 having pulse width PW represented by a time difference (Tep−To), and having an arbitrary energy level A. Some of the emitted energy will be reflected by target object 20 and is returned as a reflected pulse 35'. The beginning of the return pulse 35' will arrive at system 200' at time t1, and the round trip time-of-flight (TOF) from emission of pulse 35 to beginning of return pulse 35' is (t1−t0). As explained herein, shutter S1 will remain open from time t0 until time Ts during which time the associated capacitor C1 will integrate charge (see FIG. 9). As noted herein, Vos is the signal that results when the shutter is open for substantially the time duration PW, and Vcs is the signal that results when the shutter is open continuously. As such, Vos/Vcs represents the ratio of the integration time with the shutter operating and with the shutter open. Integration time with the shutter open is PW, and integration time with the shutter operating is Tshutter= PW·(Vos/Vcs). Integration time Tshutter starts at time t1 when the return pulse is received, and ends at time Ts when the shutter is closed. As indicated by FIG. 10, Tshutter=(Ts−t1)=PW−{TOF−(Ts−Tep)}. It follows from these timing relationships for Tshutter that:

$$TOF = \frac{V_{CS} - V_{OS}}{V_{CS}} \cdot PW + Ts - Tep.$$

Indeed, an electronic shutter may be constructed using a controlled source such as a current-controlled current source. A pixel detector will produce a current $I_s$ proportional to the number of received photons, which may be mirrored with a current-controlled current source to produce current $I_m$, where $I_m = K \cdot I_s$, where K is a constant. Rather than directly measure pixel detector charge, charge on capacitor C1 is measured. The shutter may be closed by turning-off the current-controlled current source such that $I_m = 0$, in which case current $I_s$ no longer affects capacitor C1.

Any incoming light photons falling upon detector 240 will produce a current that is amplified by unit 610. As long as shutter S1 is open, the amplified charge-detected pixel output from unit 610 will charge capacitor C1. Conversely, when shutter S1 is closed (as shown in FIG. 9), no additional charge from unit 610 is received by charge accumulator or integrator C1.

Thus, for an object relatively near the pixel detector, substantially all of the light pulse generated photons from the object surface can reach the detector before the shutter closes. However, for a relatively distant object, photons resulting from the end of the light source pulse may not have sufficient time to reach the sensor before the shutter closes and hence will be discarded. By calculating the fraction of photons from the pulse that are blocked by the shutter, distance to the object can be computed.

As described earlier, controller or processor 260 causes circuit 285 to drive light source 220 to emit a pulse of light at time t0. However at or before time t0, controller 260 causes each charge integrator C1 to discharge any charge, and then opens the associated shutter S1. In response to being illuminated with the emitted light pulse, different portions of the surface of object 20 reflect light back towards system 200'.

Eventually pixels focused upon the nearest surface of object 20 (e.g., at distance Z1 in FIG. 8) begin to detect incoming photons. The current charge from these pixels is amplified by amplifier 610 and charges, via the open shutter S1, capacitor C1. As long as S1 is open C1 will continue to accumulate charge. After a while, pixels focused upon slightly further object distances begin to detect incoming photons, and begin to accumulate charge on their own accumulator C1, via their individual amplifier and shutter.

Note that integrators C1 associated with pixels focused on nearer object surfaces begin to integrate charge sooner in time than other integrators, and thus can accumulate more charge per unit time. After a time approximating the emitted light pulse width, controller 260 causes all shutters to close, preferably simultaneously. At this point, the accumulated charge on each accumulator C1 is static, or frozen. If desired, some or all of the shutters may be opened in any desired sequence, including randomly, rather than simultaneously.

It is seen that the accumulated charge magnitude for each C1 for each pixel provides direct roundtrip TOF data to the object point upon which such pixel is focused, e.g.:

$$i_1 = C1 \cdot (\Delta V / \Delta t)$$

where $i_1$ is current output by a pixel detector, C1 is the associated current integrator, $\Delta V$ is the signal change across C1 resulting from accumulated charge current, and $\Delta t$ is the time over which the charge is accumulated.

Preferably one set of data is collected with all shutters remaining open for perhaps the period of the emitted light pulse train frequency. Charge gathered during this data set represents point-by-point reflected luminosity for the object surface. Such charge permits correcting for errors caused by more distant but more reflective object surface portion. For TOF≧0, the underlying relationship is given by:

$$TOF = [(Vcs - Vos)/Vcs] \cdot PW + Ts - Tep$$

where Vcs is the signal resulting from the continuously open shutter, Vos is the signal resulting from a shutter opened for substantially the light pulse width duration, Tep is time of pulse end, Ts is time shutter closed, and PW is the time duration of the light pulse width.

If a shutter remained open, the total number of photons falling on a pixel detector is given by $$N_o = K \cdot PW$$

where K is a constant that depends on the illumination intensity of the object, object reflectivity, and lens aperture. If $Ts - (t_0 + 2Z/C) < PW$, the shutter will clip the tailend of the reflected light pulse energy, and the number of effective photons received by the pixel detector will become:

$$N_s = K \cdot (T_s - t_0 - 2Z/C)$$

from which distance Z is obtained as:

$$Z=C/2\cdot(N_s\cdot PW/N_o+t_0-TS)$$

The accuracy of this method depends on how accurately Ns can be measured. Both $N_s$ and $N_o$ are measured by measuring the resulting charge on the sensor, for example using an A/D converter. Using a laser light source power of about 10W, a 1 cm distance difference can result in variation $\Delta N_s$ of $N_s$ of about a hundred photons. To boost the accuracy multiple pulses in a cumulative fashion can be performed.

Using this technique, the light source is pulsed repeatedly without clearing charge on the sensor between pulses. The charge on the sensor is thus the cumulative charge produced by all the reflected light pulses for which photo energy is detected. The cumulative charge is proportional to the cumulative number of effective photons summed over the number (n) of all pulses. By way of example, charge difference for a 1 cm distance change will be n·$\Delta N_s$, which for n=100 results a charge difference n·$\Delta N_s$ on the order of tens of thousands of photons.

Comparing the first and second embodiments of the present invention, in the first embodiment it is relatively easy to detect the onset of a relatively long-lasting and late arriving amount of photon energy. However in the second embodiment, typically pulse width PW is on the order of 100 ns, and Vcs is about 2 mV, and for 1 cm resolution, variation in TOF will be about 100 ps. In this example, variation of (Vcs−Vos) will be on the order of about 2 $\mu v$ (2 mV/100 ns·0.1 ns). A 2 $\mu V$ variation represents detection of a relatively few electrons and will generally be unresolvable with conventional A/D converters.

Nonetheless, the magnitude of voltage variation of (Vcs−Vos) may be enhanced by emitting multiple light pulses and allowing the photon energy to accumulate or build-up repeatedly on the charge integrators. Thus, if 200 light pulses were emitted per measurement, the variation voltage to be resolved would be on the order of 400 $\mu V$, which magnitude is resolvable with conventional A/D converters. Since the noise component of the accumulated charge build-up is random, the S/N ratio can be substantially enhanced.

The preferred embodiments of the present invention advantageously can be fabricated with processor 260 on the same IC chip containing the detector array and associated electronics. Processor 260 can access and store in RAM memory portion 270 consecutive acquired image frames. The processor can compare successive frames acquired by the sensor array at close time intervals to compute the velocity field of the image at each pixel, since each frame contains distance values for each pixel. The velocity field at a pixel in the direction normal to the array can be easily computed as follows:

$$V_z=(d_{n+1}-d_n)/\text{FrameRate}$$

where $(d_{n+1}-d_n)$ is the difference in distance measurements between two consecutive frames. The velocity field in the two other dimensions can be calculated by first identifying the contours of the different planes in the image, where each plane corresponds to an object that occludes its background. Object contours will manifest as discontinuities in the distance from target to the sensor array. By identifying the contours, pixel-detected objects in pixels corresponding to same object (e.g., a person's head) may be identified as they are all within the same contour.

Movement of objects within a contour is computed by identifying contour movements between frames. The pixels within the contour can all receive a uniform velocity, which is the velocity of the contour. Since objects can be identified using their contours, one can track objects of interest using the on-chip processor. Thus, the IC chip can export a single value (DATA) to represent change in location of the entire object whenever it has moved. Thus instead of exporting from the IC chip an entire frame of pixels at the frame rate, a single vector representing the change in location of the object of interest may instead be sent. So doing results in a tremendous reduction in chip input/output and can greatly reduce off-chip data processing requirements.

Modifications and variations may be made to the disclosed embodiments without departing from the subject and spirit of the invention as defined by the following claims.

What is claimed is:

1. A method to determine distance Z within resolution $\Delta Z$ between at least one pixel detector and a target less than about 100 m distant, the method comprising the following steps:

(a) disposing said at least one pixel detector so as to detect optical energy reflected from said target, each said pixel detector having a pixel integration delay time exceeding 2·$\Delta Z$/C, where C is speed of light, and for each said pixel detector disposing an associated pixel time interval counter;

(b) illuminating said target at time t0 with at least a first pulse of optical energy from an energy source;

(c) starting each said pixel time interval counter at said time t0 to count a clock signal operating at frequency at least about C/(2·$\Delta Z$);

(d) halting each said pixel time interval counter when an associated said pixel detector detects optical energy reflected from said target resulting from said first pulse; wherein detection time for said pixel detector includes actual time of flight (TOF) from said energy source to said target to said pixel detector, as well as pixel integration delay time for said pixel detector; and (e) removing said pixel integration delay time on a per pixel detector basis to obtain said actual TOF, whereby said distance Z is obtained.

2. The method of claim 1, wherein step (a) includes disposing an array of pixel detectors, each pf said pixel detectors having a pixel integration delay time exceeding 2·$\Delta Z$/C, where C is speed of light; said array including for each of said pixel detectors an associated pixel time interval counter.

3. The method of claim 1, wherein step (e) results in a direct digital measurement of time when said pixel detector detects energy.

4. The method of claim 1, wherein said clock signal exceeds 100 MHz.

5. The method of claim 1, wherein said pixel time interval counter is a pseudo random sequence digital counter.

6. The method of claim 1, wherein said pixel time interval counter is a true single phase clocked pseudo random sequence digital counter.

7. The method of claim 1, wherein said pixel time interval counter includes sub-clock period capacitor charging.

8. The method of claim 2, wherein information detected by said pixel detectors in said array may be randomly readout from said array.

9. The method of claim 1, wherein step (b) includes outputting optical energy pulses of varying amplitude, and wherein step (e) uses reflected energy from said pulses of varying amplitude to determine said pixel integration delay time.

10. The method of claim 1, further including:
outputting multiple optical energy pulses; and
averaging detection time for each said pulse to enhance signal/noise ratio in said determining said distance Z.

11. The method of claim 1, wherein at least one of step (a), step (c), step (d), and step (e) are carried out on a common integrated circuit substrate.

12. A CMOS-implementable integrated circuit (IC) time of flight (TOF) measurement system used with a generator that outputs light pulses commencing at time t0 to determine distance Z within resolution $\Delta Z$ between said IC and a target less than about 100 m distant, the IC including:
an array comprising a plurality of pixel detectors to detect generated light pulse energy returned from said target, each of said pixel detectors having a pixel integration delay time exceeding $2 \cdot \Delta Z/C$, where C is speed of light, said array further comprising for each of said pixel detectors an associated pixel time interval counter;
a system clock providing countable clock pulses to each said pixel time interval counter, said clock having a frequency at least about $C/(2 \cdot \Delta Z)$;
logic to enable each said pixel time interval counter to count said clock pulses commencing with start of a generated light pulse at said time t0, and to disable each said pixel time interval counter from further counting clock pulses when an associated pixel detector detects energy from the generated said light pulse;
wherein detection time for each said pixel detector includes actual time of flight (TOF) from said generator to said target to said pixel detector, as well as pixel integration delay time for said pixel detector; and
wherein said pixel integration delay time may be removed on a per pixel detector basis to obtain said actual TOF such that a direct digital measurement proportional to said distance Z is obtained.

13. The IC of claim 12, wherein:
said system clock has at least one characteristic selected from a group consisting of (a) a clock rate exceeding about 100 MHz, (b) said clock pulses are single-phase clock pulses, (c) said clock compensates for clock pulse phase at each of said pixel detectors, and (d) said clock includes means for maintaining relative clock edge integrity.

14. The IC of claim 12, wherein each said pixel time interval counter is a pseudo random sequence counter.

15. The IC of claim 12, further including means for providing sub-clock period capacitor charging to measure output of each said pixel time interval counter.

16. The IC of claim 12, further including means to average detection time of multiple said pulses to enhance signal/noise ratio in determining said distance Z.

17. The IC of claim 12, further including means for collecting data over multiple light pulses, said means for collecting data including at least one of (a) a look-up calibration table for said IC to compensate for said pixel integration delay, and (b) means for examining characteristics associated with various of said pixel detectors to compensate for said pixel integration delay.

18. The IC of claim 12, further including a processor to process outputs from each said pixel time interval counter to provide Z distance data relating to said target.

19. The IC of claim 18, wherein said processor can determine at least one of (a) said Z distance from said IC to said target, (b) velocity of said target, (c) relative shape of said target, and (d) relative identification of said target.

20. A method to determine distance Z between a detector array and a target less than about 100 m distant, the method comprising the following steps:

(a) disposing said array so as to detect optical energy reflected from said target, the array comprising a plurality of pixel detectors, and for each pixel detector providing an associated charge collector, and for each pixel detector an associated shutter disposed intermediate an associated said pixel detector and associated said charge collector to control ability of said charge collector to collect charge output by an associated said pixel detector;

(b) at time t0, illuminating said target with a first pulse of optical energy having pulse width PW and opening each said shutter to permit said collector to collect any output resulting from detected optical energy reflected from said target resulting from said pulse;

(c) beginning at said time t0 to accumulate in each said collector any charge output by an associated said pixel detector;

(d) at a time Tep, corresponding to approximately PW=Tep–t0, closing each said shutter to disable each said associated collector from accumulating further charge;

(e) after said time Tep, evaluating charge associated in each said collector to obtain a measure of actual time of flight (TOF) for each said pixel detector to said target; and (f) at a subsequent time outputting a second pulse of known PW and opening and retaining open each said shutter until cessation of detected energy from said second pulse;

wherein said distance Z to said target may be determined.

21. The method of claim 20, further including accumulating charge in each collector using at least two pulses of known PW with said shutter enabled, and accumulating charge in said collector using at least two pulses of said known PW with said shutter disabled to obtain calibration data representing light reflectivity of said target;
wherein measurement accuracy is enhanced.

22. The method of claim 20, further including accumulating charge in at least one of said pixel detectors to obtain calibration data representing reflectivity of said target.

23. A CMOS-implementable integrated circuit (IC) time of flight (TOF) measurement system used with a generator outputting at least a first light pulse of pulse width PW to determine distance Z between said IC and a target less than about 100 m distant, the IC comprising:
an array of pixel detectors to detect generated light pulse energy returned from said target, each pixel detector having a pixel integration delay time exceeding $2 \cdot \Delta Z/C$ where C is speed of light;
for each of said pixel detectors, an associated charge collector, and for each pixel detector an associated shutter disposed intermediate an associated said pixel detector and associated said charge collector to control ability of said charge collector to collect charge output by an associated said pixel detector;
logic that opens each said shutter at a time t0 representing start of a generated said first light pulse to permit said collector to collect any output resulting from detected optical energy reflected from said target resulting from said first pulse, said logic closing each said shutter at a time Tep corresponding to approximately PW=Tep–t0 width of each said first pulse to disable each said associated collector from accumulating further charge;
means for evaluating accumulated charge after said time Tep accumulated in each said collector to obtain a measure of actual time of flight (TOF) for each said pixel detector to said target;

said logic further opening and retaining open each said shutter, at a subsequent time corresponding to output duration of a second pulse of known pulse width, until cessation of detected energy from said second pulse;

wherein said distance Z to said target may be determined.

24. The IC of claim 23, wherein said logic permits opening each said shutter to obtain calibration data representing light reflectivity of said target.

25. The IC of claim 23, further including a microprocessor to determine from evaluated said accumulated charge at least one of (a) distance Z from said IC to said target, (b) velocity of said target, (c) relative shape of said target, and (d) relative identification of said target.

* * * * *